United States Patent
Yukawa et al.

(10) Patent No.: US 12,010,962 B2
(45) Date of Patent: Jun. 18, 2024

(54) ENVIRONMENT CONTROLLED GREENHOUSE

(71) Applicant: PLANTS LABORATORY, INC., Tokyo (JP)

(72) Inventors: Atsuyuki Yukawa, Tokyo (JP); Shinji Shimizu, Tokyo (JP)

(73) Assignee: PLANTS LABORATORY, INC., Tokyo (JP)

( * ) Notice: Subject to any disclaimer, the term of this patent is extended or adjusted under 35 U.S.C. 154(b) by 733 days.

(21) Appl. No.: 16/326,605

(22) PCT Filed: Oct. 21, 2016

(86) PCT No.: PCT/JP2016/081277
§ 371 (c)(1),
(2) Date: Nov. 4, 2021

(87) PCT Pub. No.: WO2018/073956
PCT Pub. Date: Apr. 26, 2018

(65) Prior Publication Data
US 2022/0117166 A1    Apr. 21, 2022

(51) Int. Cl.
*A01G 9/00* (2018.01)
*A01G 9/14* (2006.01)
(Continued)

(52) U.S. Cl.
CPC ............. *A01G 9/1407* (2013.01); *A01G 9/16* (2013.01); *E04B 1/19* (2013.01); *E04B 1/3211* (2013.01)

(58) Field of Classification Search
CPC ...... A01G 9/1407; A01G 9/14; A01G 9/1415; A01G 9/1438; A01G 9/16; E04B 1/19;
(Continued)

(56) References Cited

U.S. PATENT DOCUMENTS 4,118,904 A * 10/1978 Sprung ................. E04H 15/648
52/63
4,878,322 A    11/1989 Ikeda et al.
(Continued)

FOREIGN PATENT DOCUMENTS

CN        1032726 A      5/1989
CN        2080747        7/1991
(Continued)

OTHER PUBLICATIONS

Second Office Action for corresponding Chinese Application No. 201680088606.2 dated Aug. 2, 2021 and its English translation.
(Continued)

*Primary Examiner* — Chi Q Nguyen
(74) *Attorney, Agent, or Firm* — Renner, Otto, Boisselle & Sklar, LLP (57) ABSTRACT

An environment control house (1) which can have improved strength by employing a multifaceted structure. The environment controlled greenhouse (1) comprises: a main body portion (10) and a pair of wall portions (20), wherein the main body portion (10) comprises: a top surface portion (101) formed into a rectangular shape and disposed at the topmost portion; a pair of rectangular upper skirt surface portions (102) connectedly installed to respective edges in the transverse direction of the top surface portion (101); and a pair of rectangular lower skirt surface portions (103) connectedly installed to an edge in the installation direction of the respective upper skirt surface portions (102) and disposed in a sloped manner with respect to an installation surface (L).

7 Claims, 8 Drawing Sheets

(51) Int. Cl.
    *A01G 9/16*     (2006.01)
    *E04B 1/19*     (2006.01)
    *E04B 1/32*     (2006.01)

(58) Field of Classification Search
    CPC ........ E04B 1/1906; E04B 1/1909; E04B 1/32; E04B 1/3205; E04B 1/3211; E04B 2001/3223; E04B 2001/3252; E04B 2001/327; E04B 2001/3276
    See application file for complete search history.

(56) References Cited

U.S. PATENT DOCUMENTS

| | | | | |
|---|---|---|---|---|
| 5,411,047 | A * | 5/1995 | Reilly | E04H 15/18 |
| | | | | 52/81.1 |
| 5,540,014 | A | 7/1996 | Smith | |
| 7,849,639 | B2 * | 12/2010 | Sprung | E04H 15/644 |
| | | | | 52/63 |
| 7,980,029 | B2 * | 7/2011 | Ahmedy | E04H 15/52 |
| | | | | 135/144 |
| 8,671,642 | B2 * | 3/2014 | Green | E04C 3/40 |
| | | | | 52/690 |
| 8,701,356 | B2 * | 4/2014 | Forsland | E04B 1/343 |
| | | | | 52/79.5 |
| 8,701,689 | B2 * | 4/2014 | Warner | E04H 15/18 |
| | | | | 135/117 |
| 9,745,769 | B2 * | 8/2017 | Morta | E04B 2/58 |
| 9,988,805 | B1 * | 6/2018 | Smith | E04B 1/1903 |
| 11,142,906 | B2 * | 10/2021 | Stafford | E04B 7/16 |
| 11,773,581 | B2 * | 10/2023 | Smith | E04C 3/40 |
| | | | | 52/63 |
| 2014/0305036 | A1 | 10/2014 | Pretsch et al. | |
| 2020/0109552 | A1 * | 4/2020 | Tucker | E04B 1/32 |
| 2020/0392721 | A1 * | 12/2020 | Tucker | E04C 3/42 |

FOREIGN PATENT DOCUMENTS

| | | |
|---|---|---|
| CN | 2297050 | 11/1998 |
| CN | 201523580 | 7/2010 |
| CN | 102318521 A | 1/2012 |
| CN | 203027816 | 7/2013 |
| DE | 3611058 A1 | 10/1987 |
| FR | 2488777 A1 | 2/1982 |
| JP | 8-228608 | 9/1996 |
| JP | 2002010713 A | 1/2002 |
| JP | 3199988 | 9/2015 |
| JP | 3200439 | 9/2015 |
| TW | 83653 | 12/1986 |

OTHER PUBLICATIONS

International Search Report for related International Application No. PCT/JP2016/081277 dated Dec. 27, 2016.
Office Action for corresponding Japanese Application No. 2018-546121 dated Oct. 29, 2019 and partial English translation.
Office Action for corresponding Taiwanese Application No. 106136103 dated Nov. 8, 2018 and partial English translation.
Office Action for corresponding Australian Application No. 2016426800 dated Jun. 18, 2020.
Office Action for corresponding European Application No. 16919172.3 dated May 18, 2020.
First Examination Report and Search Report for corresponding United Arab Emirates Application No. P6000573 / 2019 dated Feb. 15, 2023.
Notice of Preliminary Rejection for corresponding Korean Application No. 10-2019-7007626 dated Mar. 12, 2021 and its English translation.
Examination Report No. 2 for corresponding Australian Application No. 2016426800 dated Oct. 30, 2020.
Office Action for corresponding Canadian Application No. 3,034,349 dated Nov. 12, 2020.
Office Action for corresponding Chinese Application No. 201680088606.2 dated Jan. 6, 2021 and its English Translation.

* cited by examiner

ENVIRONMENT CONTROLLED GREENHOUSE

TECHNICAL FIELD

The present invention relates to an environment controlled greenhouse.

BACKGROUND ART

Environment controlled greenhouses that are installed with a framework configured in an arched shape (e.g., vinyl greenhouses) have been known. Such environment controlled greenhouses are installed by forming side surfaces with surfaces that are perpendicular to the ground and forming a roof on the side surfaces.

Since environment controlled greenhouses continue to be exposed to wind or rain, higher durability (weather resistance) against wind or the like is required. In contrast to "semi-cylindrical" vinyl greenhouses or vinyl greenhouses with an "arched" roof portion erected with pipes, a greenhouse framework structure with a gable formed into an arched shape has been proposed (see, for example, Patent Literature 1). According to the proposed vinyl greenhouse framework structure, an increase in surface pressure is reduced compared to greenhouses having a gable formed as a single flat surface when a strong wind blows onto the gable. Therefore, the risk of damage to vinyl chloride sheets can be reduced.

CITATION LIST

Patent Literature

Patent Literature 1: Japanese Registered Utility Model Publication No. 3200439

SUMMARY OF INVENTION

Technical Problem

While it is conceivable to improve the strength by configuring the structure of an environment controlled greenhouse to have an arched structure as discussed above, it is also conceivable to improve the strength by limiting the effect of wind with a multifaceted structure.

The objective of the present invention is to provide an environment controlled greenhouse that can have improved strength by employing a multi-faceted structure.

Solution to Problem

The present invention relates to a vinyl greenhouse comprising: a main body portion formed into an approximately arched shape with a plurality of flat surfaces; and a pair of wall portions, which are installed on respective ends in a longitudinal direction of the main body portion and are comprised of a plurality of flat surfaces that are sloped with respect to an installation surface, wherein the main body portion comprises: a top surface portion formed into a rectangular shape and disposed at the topmost portion; a pair of rectangular upper skirt surface portions connectedly installed to respective edges in a transverse direction of the top surface portion; and a pair of rectangular lower skirt surface portions connectedly installed to an edge in an installation direction of the respective upper skirt surface portions and disposed in a sloped manner with respect to the installation surface, wherein each of the wall portions comprises: a center wall surface portion connectedly installed to an edge in the longitudinal direction of the top surface portion; a pair of middle wall surface portions connectedly installed to respective edges in the transverse direction of the center wall surface portion and to an edge in the longitudinal direction of the upper skirt surface portion; and a pair of side wall surface portions connectedly installed to an edge in the transverse direction of the respective middle wall surface portions and to an edge in the longitudinal direction of the respective lower skirt surface portions.

Further, the center wall surface portion may comprise: a rectangular center upper wall surface portion connectedly installed to an edge in the longitudinal direction of the top surface portion; and a rectangular center lower wall surface portion connectedly installed to an edge in an installation direction of the center upper wall surface portion and disposed at an angle with respect to the center upper wall surface portion.

Further, the top surface portion may comprise a pair of rectangular top board portions, which are disposed adjacent to each other in the transverse direction and form a ridge portion at adjacent positions.

Further, the center upper wall surface portion may comprise: a pair of top surface side wall surface portions, which are disposed adjacent to each other in the transverse direction and disposed in a ridge forming manner; and a triangular center triangular wall surface portion in continuous contact with the pair of top surface side wall surface portions and in continuous contact with the center lower wall surface portion.

Further, each of the middle wall surface portions may comprise: a triangular upper triangular wall surface portion connectedly installed to the edge in the longitudinal direction of the upper skirt surface portion and to an edge in the transverse direction of the center upper wall surface portion; a triangular middle triangular wall surface portion connectedly installed to a remaining edge of the upper triangular wall surface portion and disposed at an angle with respect to the upper triangular wall surface portion; and a triangular lower triangular wall surface portion connectedly installed to an edge of the middle triangular wall surface portion, connectedly installed to an edge in the transverse direction of the center lower wall surface portion, and disposed at an angle with respect to the middle triangular wall surface portion and the center lower wall surface portion.

Further, the side wall surface portions may be formed into a triangular shape.

Further, every surface constituting the upper skirt surface portions, the lower skirt surface portions, and the pair of wall portions may be sloped facing upward.

Advantageous Effects of Invention

According to the present invention, a vinyl greenhouse that can have improved strength by employing a multifaceted structure can be provided.

DESCRIPTION OF EMBODIMENTS

First Embodiment

Hereinafter, the first embodiment of the environment controlled greenhouse according to the present invention is explained with reference to FIGS. 1 to 4. The following embodiments explain a vinyl greenhouse as an example of one type of environment controlled greenhouse 1.

The environment controlled greenhouse 1 according to this embodiment is assembled using a plurality of frameworks such as arch pipes and coupling members. In addition, the environment controlled house 1 is installed by attaching preferably a sheet of semitransparent or transparent or nontransparent resin sheet or a plurality of planks to the framework. The environment controlled greenhouse 1 is thereby installed on an approximately horizontal, outdoor installation surface L as a structure with a plurality of surfaces.

The environment controlled greenhouse 1 which is formed using a resin sheet is explained in this embodiment. Since the surface of the environment controlled greenhouse 1 is configured using a resin sheet, this embodiment is explained while deeming that various surfaces are not limited to those that are flush, but include those that are distorted due to wrinkles or the like. In the following embodiments, "longitudinal direction" refers to the direction along the ridge (purlin) of the environment controlled house 1, and "transverse direction" refers to the direction along a beam of the environment controlled greenhouse 1.

Figure 1:
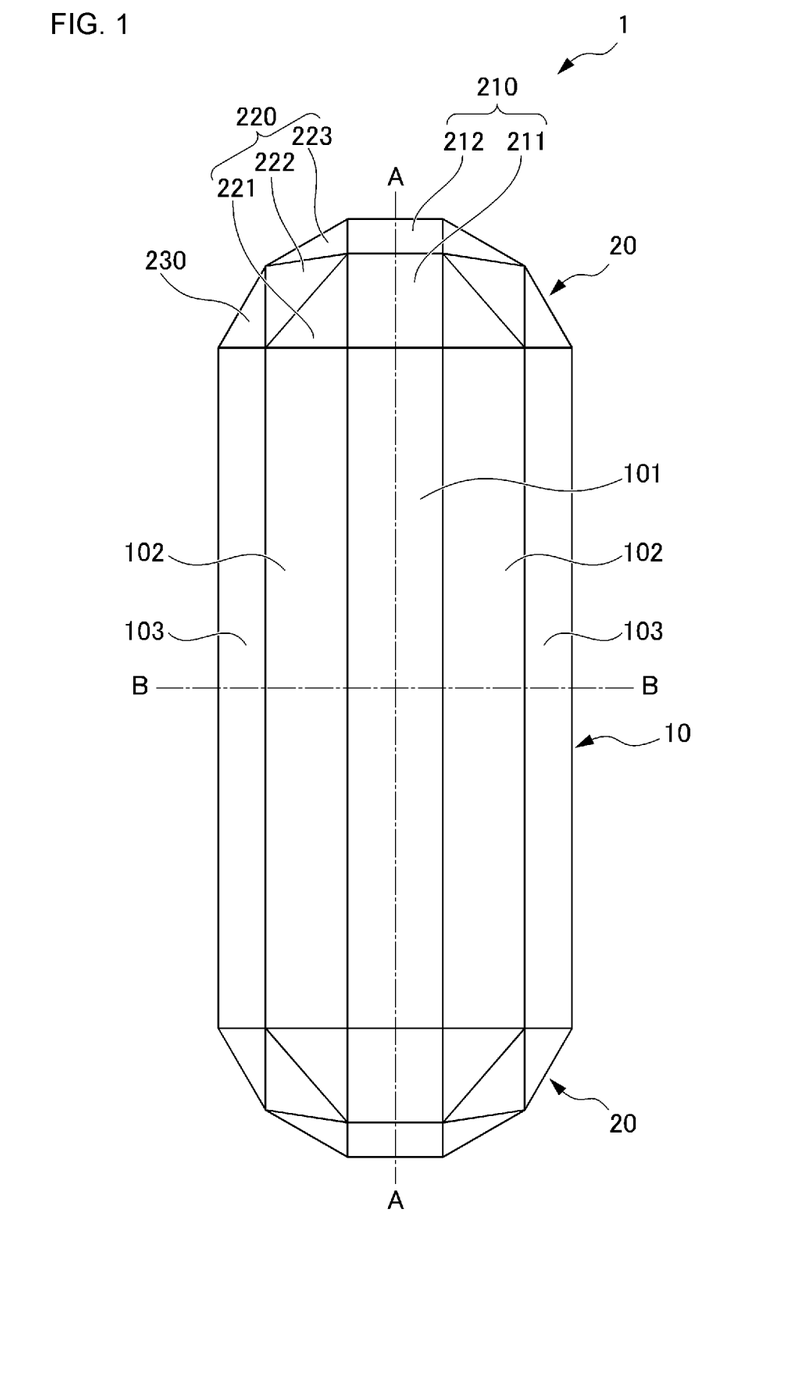
FIG. 1 depicts a plan view of the environment controlled greenhouse according to the first embodiment of the invention.
Figure 2:
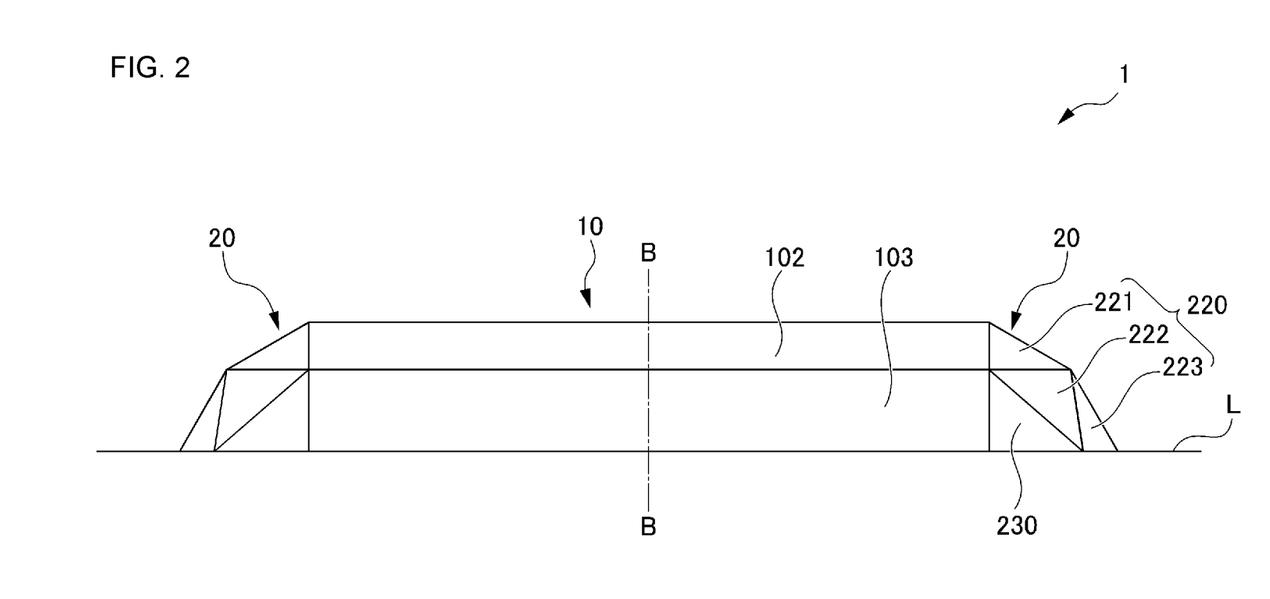
FIG. 2 depicts a side view of the environment controlled greenhouse of the first embodiment.
Figure 3:
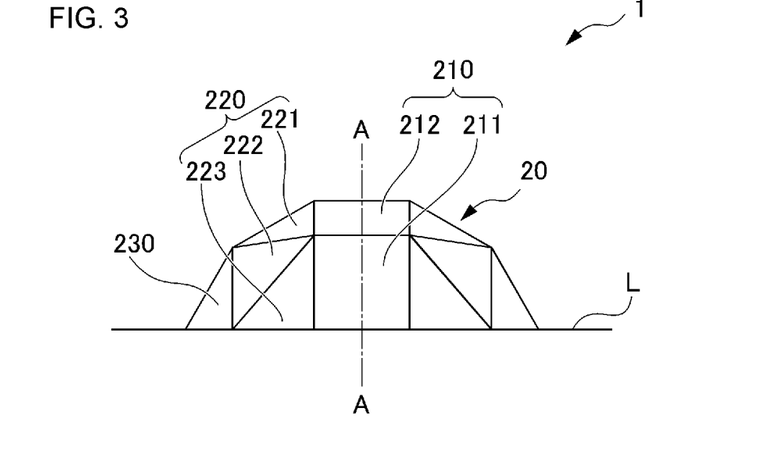
FIG. 3 depicts another side view of the environment controlled greenhouse of the first embodiment.
Figure 4:
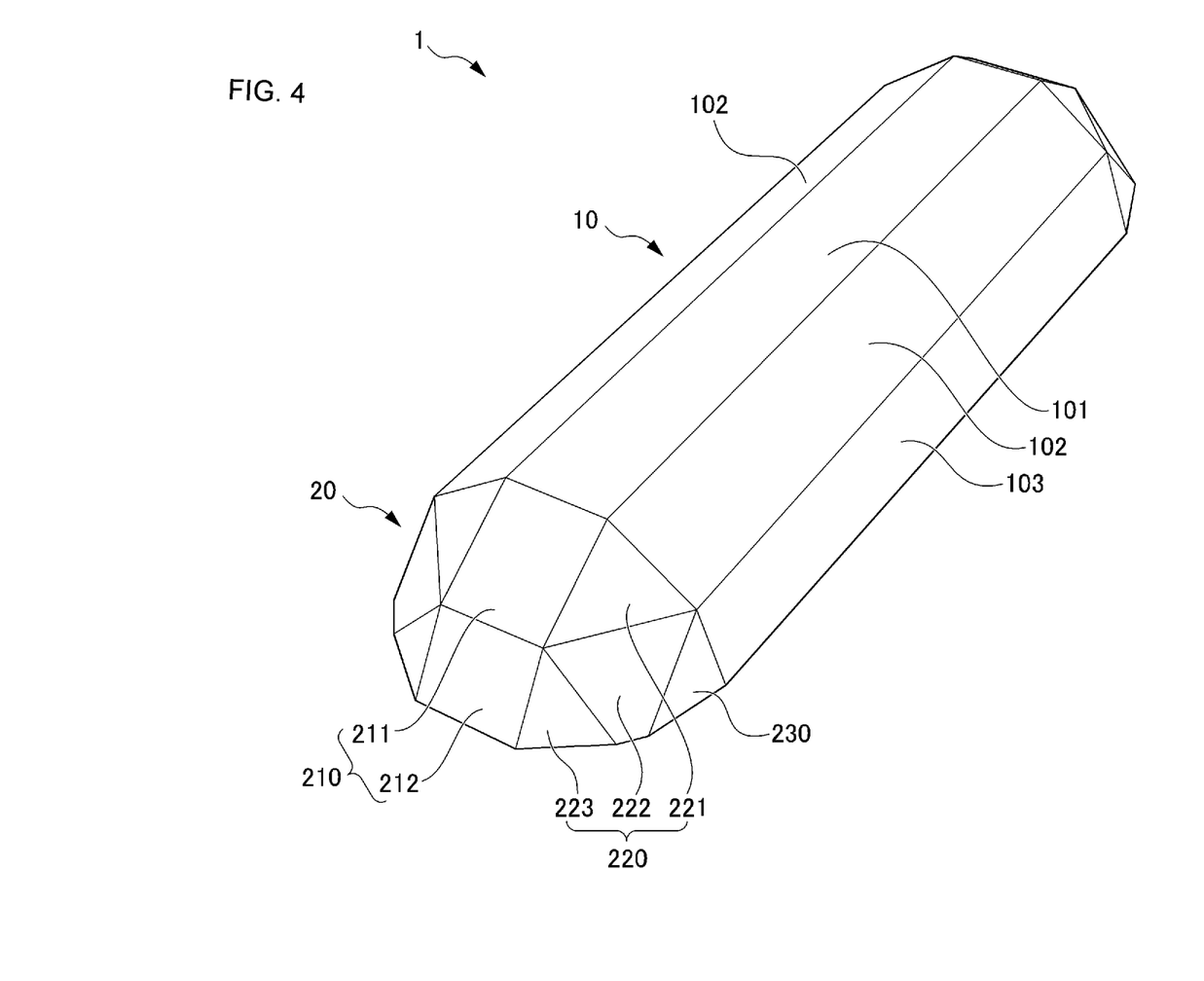
FIG. 4 depicts a perspective view of the environment controlled greenhouse of the first embodiment.
Figure 5:
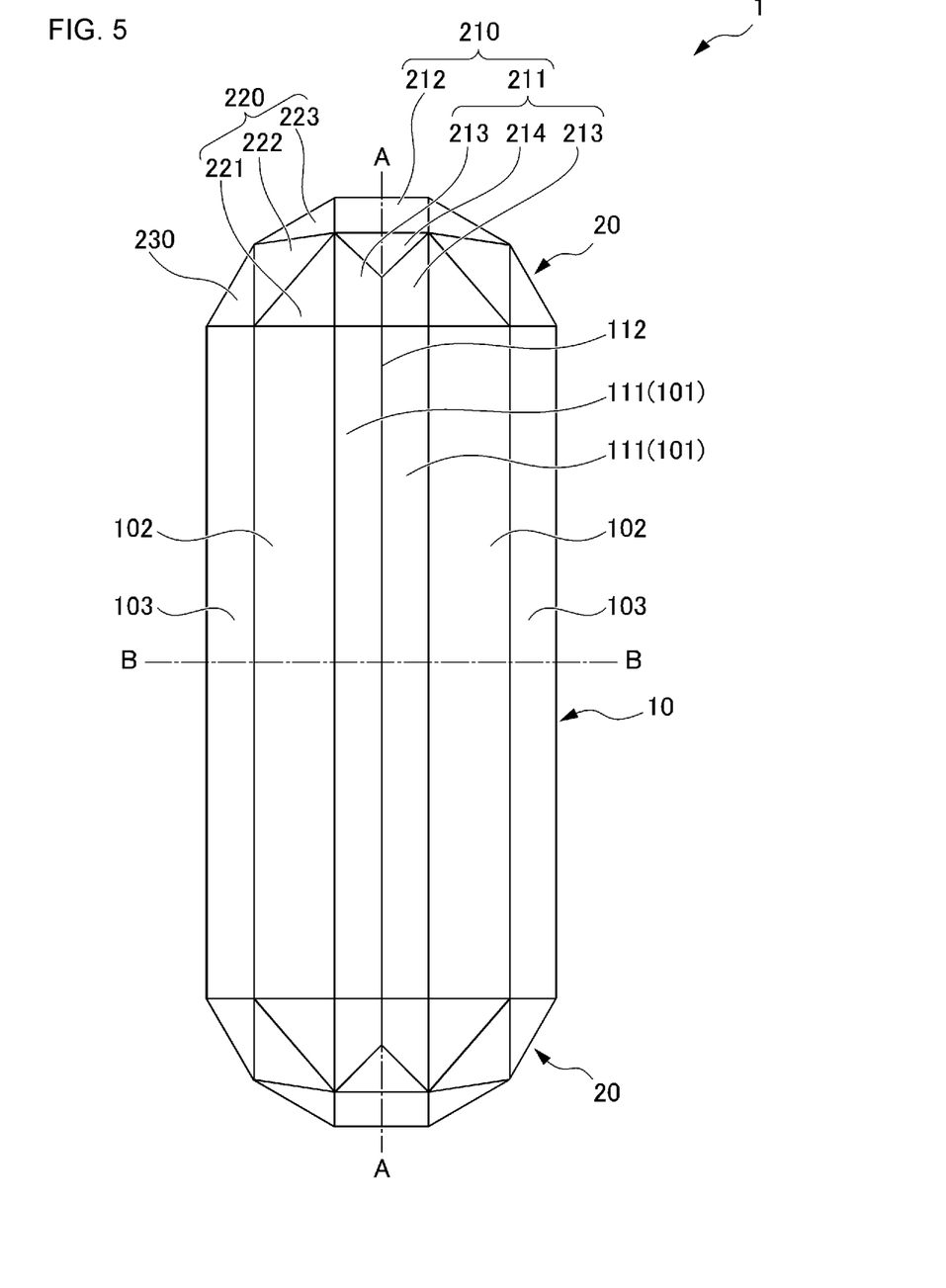
FIG. 5 depicts a plan view of the environment controlled greenhouse according to the second embodiment of the invention.
Figure 6:
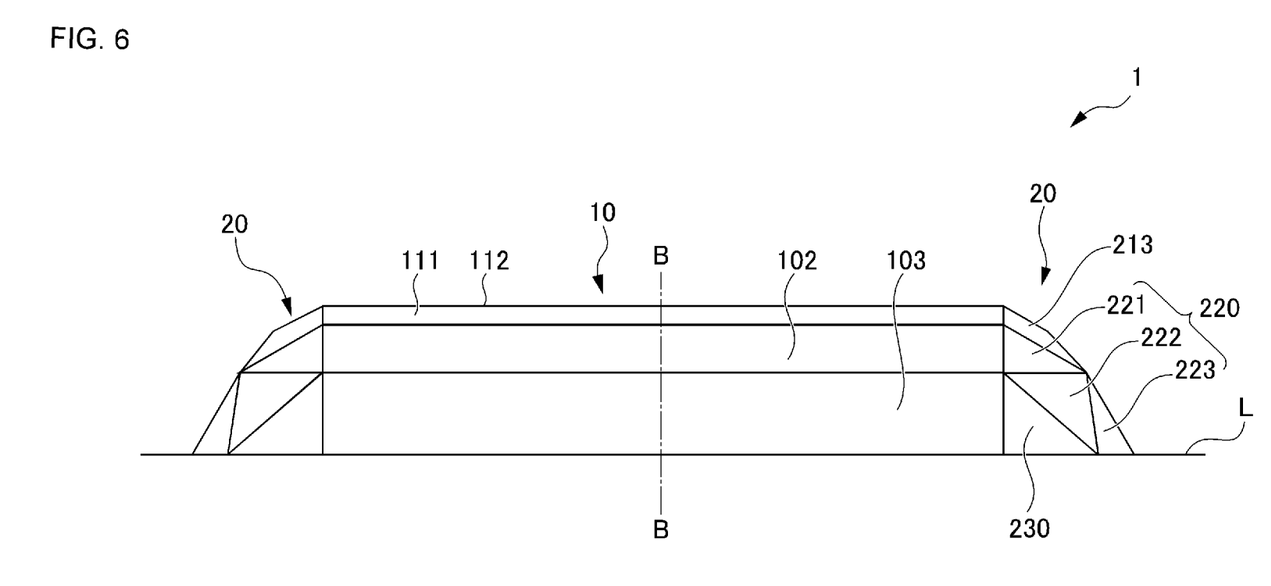
FIG. 6 depicts a side view of the environment controlled greenhouse of the second embodiment.
Figure 7:
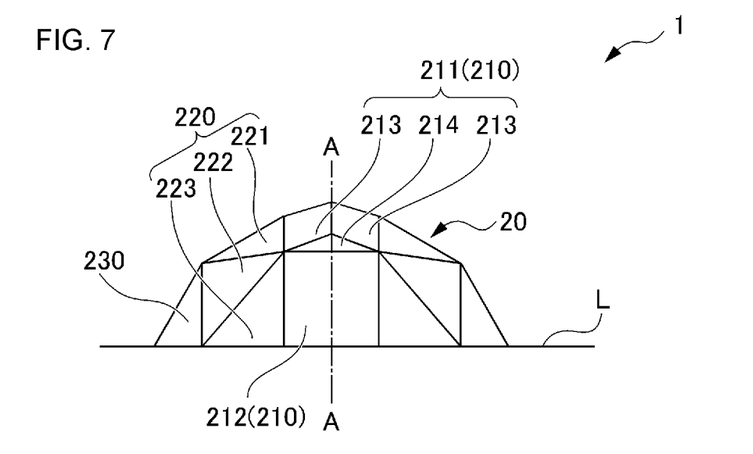
FIG. 7 depicts another side view of the environment controlled greenhouse of the second embodiment.
Figure 8:
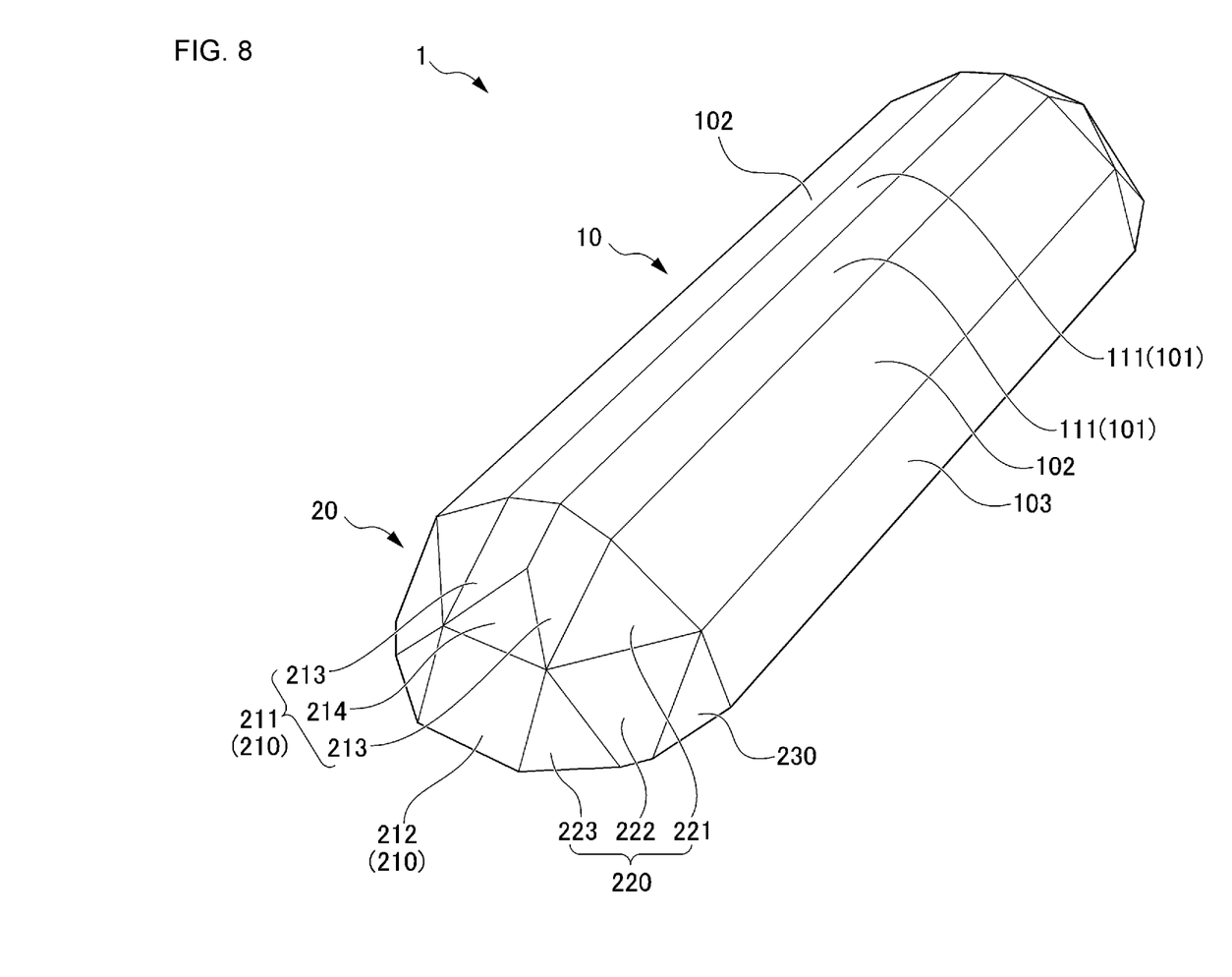
FIG. 8 depicts a perspective view of the environment controlled greenhouse of the second embodiment.

Such an environment controlled greenhouse 1 comprises a main body portion 10 and a pair of wall portions 20, 20 as depicted in FIGS. 1 to 4. FIG. 1 depicts a side view of the environment controlled greenhouse 1 of this embodiment. FIG. 2 depicts a side view of the environment controlled greenhouse 1 of this embodiment. FIG. 3 depicts another side view of the environment controlled greenhouse 1 of this embodiment. FIG. 4 depicts a perspective view of the environment controlled greenhouse 1 of this embodiment.

The main body portion 10 is formed into an approximately arched shape with a plurality of flat surfaces. The main body portion 10 constitutes the so-called trunk portion of the environment controlled greenhouse 1. Such a main body portion 10 comprises a top surface portion 101, a pair of upper skirt surface portions 102, 102, and a pair of lower skirt surface portions 103, 103.

The top surface portion 101 is formed into a sheet, and is formed into a rectangular shape by being disposed in a rectangularly defined region and disposed at the topmost portion (ridge portion). The top surface portion 101 is disposed to be approximately parallel to the installation surface L (horizontal surface). The top surface portion 101 is thereby disposed so that a flat surface faces upward.

The pair of upper skirt surface portions 102, 102 is formed into a sheet and connectedly installed to respective edges in the transverse direction of the top surface portion 101. Each of the pair of upper skirt surface portions 102, 102 is disposed in a rectangularly defined region to be formed into a rectangular shape and is formed to have approximately the same length as the longitudinal length of the top surface portion 101. For each of the pair of upper skirt surface portions 102, 102, an edge (side) on one side in the transverse direction is connectedly installed to an edge (side) on one end in the transverse direction of the top surface portion 101. Each of the pair of upper skirt surface portions 102, 102 is connectedly installed to the top surface portion 101 at an angle.

The pair of lower skirt surface portions 103, 103 is formed into a sheet and connectedly installed to an edge in the installation direction of the pair of the respective upper skirt surface portions 102, 102. In addition, each of the pair of lower skirt surface portions 103, 103 is disposed in a sloped manner with respect to the installation surface L. Specifically, each of the pair of lower skirt surface portions 103, 103 is disposed so that the installation surface L forms an acute angle with the surface facing the installation surface L. Each of such a pair of lower skirt surface portions 103, 103 is formed into a rectangular shape and is formed to have approximately the same length as the top surface portion 101 and the upper skirt surface portions 102. For each of the pair of lower skirt surface portions 103, 103, an edge (side) on one side in the transverse direction is connectedly installed to an edge (side) on the other end in the transverse direction of the upper skirt surface portions 102. For each of the pair of lower skirt surface portions 103, 103, an edge on the other end in the transverse direction contacts the installation surface L. Each of the pair of lower skirt surface portions 103, 103 is connectedly installed to the upper skirt surface portion 102 at an angle.

According to the above main body portion 10, each of the top surface portion 101, the pair of upper skirt surface portions 102, 102, and the pair of lower skirt surface portions 103, 103 is disposed at an angle with respect to the member to which it is connectedly installed to form an approximately arch shaped cross-section as a whole. Therefore, since there is no surface that is perpendicular to the installation surface L, even if the main body portion 10 is subjected to wind from any transverse direction of the main body portion 10, the upper skirt surface portion 102 and the lower skirt surface portion 103 on the side subjected to the wind receive a downward component force from the wind. Therefore, the strength of the environment controlled greenhouse 1 can be improved against wind from the transverse direction of the main body portion 10, Furthermore, each of the top surface portion 101, the pair of upper skirt surface portions 102, 102, and the pair of lower skirt surface portions 103, 103 is disposed so as to from an obtuse angle with respect to the member to which it is connectedly installed. Therefore, wind from the transverse direction can be redirected to the surface direction to prevent receiving a large force from the wind.

The pair of wall portions 20, 20 is comprised of a plurality of flat surfaces sloped with respect to the installation surface L. Each of such a pair of wall portions 20, 20 comprises a center wall surface portion 210, a pair of middle wall surface portions 220, 220, and a pair of side wall surface portions 230, 230.

The center wall surface portion 210 is connectedly installed to the edge in the longitudinal direction of the top surface portion 101. Such a center wall surface portion 210 comprises a center upper wall surface portion 211 and a center lower wall surface portion 212.

The center upper wall surface portion 211 is formed into a sheet, and is formed into a rectangular shape by being disposed in a rectangularly defined region and is connectedly installed to the edge in the longitudinal direction of the top surface portion 101. The center upper wall surface portion 211 is formed to have approximately the same width as the width in the transverse direction of the top surface portion 101. For the center upper wall surface portion 211, an edge (side) on one end in the longitudinal direction is connectedly installed to an edge (side) on one side in the longitudinal direction of the top surface portion 101. The center upper wall surface portion 211 is also connectedly installed at an angle with respect to the top surface portion 101.

The center lower wall surface portion 212 is formed into a sheet, and is formed into a rectangular shape by being disposed in a rectangularly defined region and is connectedly installed to the edge in the installation direction of the center upper wall surface portion 211. The center lower wall surface portion 212 is also disposed at an angle with respect to the center upper wall surface portion 211. In addition, the center lower wall surface portion 212 is formed to have approximately the same width as the top surface portion 101 and the center upper wall surface portion 211. Such a center lower wall surface portion 212 is connectedly installed so that an edge (side) on one side in the longitudinal direction overlaps an edge (side) on the other end in the longitudinal direction of the center upper wall surface portion 211. For the center lower wall surface portion 212, the edge (side) on the other end in the longitudinal direction is sloped with respect to and contacts the installation surface L.

The pair of middle wall surface portions 220, 220 is connectedly installed to respective ends in the transverse direction of the center wall surface portion 210 and to the edges in the longitudinal direction of the upper skirt surface portions 102. Each of such a pair of middle wall surface portions 220, 220 comprises an upper triangular wall surface portion 221, a middle triangular wall surface portion 222, and a lower triangular wall surface portion 223.

The upper triangular wall surface portion 221 is formed into a sheet, and is formed into a triangular shape by being disposed in a triangularly defined region. The upper triangular wall surface portion 221 is connectedly installed to the edge in the longitudinal direction of the upper skirt surface portion 102, and to the edge in the transverse direction of the center upper wall surface portion 211. Specifically, the upper triangular wall surface portion 221 is connectedly installed so that one edge (side) overlaps the edge (side) in the longitudinal direction of the upper skirt surface portion 102, and another edge (side) overlaps the edge (side) on one end in the transverse direction of the center upper wall surface portion 211. In addition, the upper triangular wall surface portion 221 is connectedly installed at an angle with respect to the upper skirt surface portion 102 and the center upper wall surface portion 211.

The middle triangular wall surface portion 222 is formed into a sheet, and is formed into a triangular shape by being disposed in a triangularly defined region. The middle triangular wall surface portion 222 is connectedly installed to the remaining edge (side) of the upper triangular wall surface portion 221 and disposed at an angle with respect to the upper triangular wall surface portion 221.

The lower triangular wall surface portion 223 is formed into a sheet, and is formed into a triangular shape by being disposed in a triangularly defined region. The lower triangular wall surface portion 223 is connectedly installed to another edge (side) of the middle triangular wall surface portion 222 and is disposed at an angle with respect to the middle triangular wall surface portion 222 and the center lower wall surface portion 212. Such a lower triangular wall surface portion 223 is installed, so that the remaining edge (side) is in contact with the installation surface L and forms an acute angle with respect to the installation surface L.

Each of the pair of side wall surface portions 230, 230 is formed into a sheet, and is formed into a triangular shape by being disposed in a triangularly defined region. For each of the pair of side wall surface portions 230, 230, one edge (side) is connectedly installed to an edge (side) in the transverse direction of the respective middle wall surface portion 220. Specifically, for each of the pair of side wall surface portions 230, 230, one edge (side) is connectedly installed to the remaining edge (side) of the middle triangular wall surface portion 222. For each of the pair of side wall surface portions 230, 230, another edge (side) is connectedly installed to the edge in the longitudinal direction of the lower skirt surface portion 103. For each of the pair of side wall surface portions 230, 230, the remaining edge (side) is installed to contact the installation surface L and to form an acute angle with respect to the installation surface L.

According to the above pair of wall portions 20, 20, the wall portions 20 can be configured to close both ends in the longitudinal direction of the main body portion 10 with a plurality of surfaces sloped with respect to the installation surface L. Each of the pair of wall portions 20, 20 does not have a surface that is perpendicular to the installation surface L. Therefore, even if the main body portion 10 is subjected to wind from any longitudinal direction of the main body portion 10, the center wall surface portion 210, middle wall surface portions 220, and side wall surface portions 230 on the side subjected to the wind receive a downward component force from the wind. Therefore, the strength of the environment controlled greenhouse 1 can be improved against wind from the longitudinal direction of the main body portion 10.

Furthermore, each of the center upper wall surface portion 211, center lower wall surface portion 212, upper triangular wall surface portion 221, middle triangular wall surface portion 222, lower triangular wall surface portion 223, and side wall surface portions 230, 230 is disposed to form an obtuse angle with respect to the member to which it is connectedly installed. Therefore, wind from the transverse direction can be redirected to the surface direction to prevent receiving a large force from the wind. In particular, the upper triangular wall surface portion 221, middle triangular wall surface portion 222, and lower triangular wall surface portion 223 are formed into a triangular shape, so that it is less likely to be deformed compared to a rectangular shape, and strength of the environment controlled greenhouse 1 can therefore be improved.

Each of the portions of the wall portion 20 excluding the middle wall surface portion 210 is composed by filling the portions with four triangular shapes, i.e., the upper triangular wall surface portion 221, the middle triangular wall surface portion 222, lower triangular wall surface portion 223, and side wall surface portion 230. The strength of the environment controlled greenhouse 1 can thereby be improved compared to filling each of the portions excluding the center wall surface portion 210 with rectangular shapes.

According to the above main body portion 10 and the pair of wall portions 20, 20, every surface constituting the upper skirt surface portion 102, lower skirt surface portion 103, and the pair of wall portions 20, 20 is sloped facing upward, so that surfaces receive a downward component force with respect to the wind. Therefore, resistance to wind can be improved.

Further, the shape of the environment controlled greenhouse 1 viewed from the longitudinal direction (shape of the wall portion 20 from the side, FIG. 3) can be configured to have a projected surface shape formed by cutting an approximately regular decagonal shape with respect to an axis of symmetry through any angle. Furthermore, the shape of the wall portion 20 viewed from above (FIG. 1) can be similarly configured to have a projected surface shape formed by cutting an approximately regular decagonal shape with respect to an axis of symmetry through any angle. In addition, the shape of the environment controlled greenhouse 1 viewed from the transverse direction (FIG. 2) can be configured to have a projected surface shape formed by cutting an approximately regular decagonal shape with respect to an axis of symmetry through any angle, if the length of the main body portion 10 is shortened so as to have the same length as the center wall surface portion 210 in the transverse direction. In this manner, a projected surface shape formed by cutting an approximately regular decagonal shape with respect to an axis of symmetry through any angle appears for each of the shape viewed from the longitudinal direction (FIG. 3), the shape viewed from above (FIG. 1), and the shape viewed from the transverse direction (FIG. 2) of the wall portion 20 of the environment controlled greenhouse 1.

The environment controlled greenhouse 1 having such a wall portion 20 can have improved overall strength. The environment controlled greenhouse 1 having such a wall portion 20 also has excellent aesthetics.

The environment controlled greenhouse 1 is formed to be line symmetric, with the center line A-A as the axis of symmetry, when viewed from the longitudinal direction as shown FIGS. 1 to 3 as a result of configuring the greenhouse in the above manner. In other words, the main body 10 and the pair of wall portions 20, 20 are formed to have line symmetry, with the center line A-A as the axis of symmetry, when viewed from the longitudinal direction. The environment controlled greenhouse 1 is also formed to be line symmetric, with the center line B-B as the axis of symmetry, when viewed from the transverse direction. The line symmetrically formed environment controlled greenhouse 1 can have improved overall strength against wind from any direction.

The above environment controlled greenhouse 1 attains the following effect.

(1) The environment controlled greenhouse 1 was constructed with: the main body portion 10 formed into an approximately arched shape with a plurality of flat surfaces; and the pair of wall portions 20, 20, which are installed on respective ends in the longitudinal direction of the main body portion 10 and are comprised of a plurality of flat surfaces that are sloped with respect to the installation surface L. In addition, the main body portion 10 was constructed with: the top surface portion 101 formed into a rectangular shape and disposed at the topmost portion; the pair of rectangular upper skirt surface portions 102, 102 connectedly installed to respective edges in the transverse direction of the top surface portion 101; and the pair of rectangular lower skirt surface portions 103, 103 connectedly installed to an edge in the installation direction of the respective upper skirt surface portions 102, 102 and disposed in a sloped manner with respect to the installation surface L. Further, each of the wall portions 20 was constructed with: the center wall surface portion 210 connectedly installed to the edge in the longitudinal direction of the top surface portion 101; the pair of middle wall surface portions 220, 220 connectedly installed to respective edges in the transverse direction of the center wall surface portion 210 and to the edge in the longitudinal direction of the upper skirt surface portion 102; and the pair of side wall surface portions 230, 230 connectedly installed to an edge in the transverse direction of the respective middle wall surface portions 220, 220 and to an edge in the longitudinal direction of the respective lower skirt surface portions 103. Since there is no surface that is perpendicular to the installation surface L thereby, a downward component force is received with respect to wind from any direction. The structure of the environment controlled greenhouse 1 can be stabilized thereby. Since the surfaces of each of the upper skirt surface portion 102, lower skirt surface portion 103, and wall portion 20 are sloped with respect to the installation surface L, all surfaces are connectedly installed at an obtuse angle, such that resistance to wind can be minimized.

(2) The center wall surface portion 210 is constructed with: the rectangular center upper wall surface portion 211 connectedly installed to the edge in the longitudinal direction of the top surface portion 101; and the rectangular center lower wall surface portion 212 connectedly installed to the edge in the installation direction of the center upper wall surface portion 211 and disposed at an angle with respect to the center upper wall surface portion 211. Since the center wall surface portion 210 is comprised of two surfaces, the strength against wind can be increased.

(3) Each of the middle wall surface portions 220, 220 was constructed with: the triangular upper triangular wall surface portion 221 connectedly installed to the edge in the longitudinal direction of the upper skirt surface portion 102 and to the edge in the transverse direction of the center upper wall surface portion 211; the triangular middle triangular wall surface portion 222 connectedly installed to the remaining edge of the upper triangular wall surface portion 221 and disposed at an angle with respect to the upper triangular wall surface portion 221; and the triangular lower triangular wall surface portion 223 connectedly installed to the edge of the middle triangular wall surface portion 222, connectedly installed to the edge in the transverse direction of the center lower wall surface portion 212, and disposed at an angle with respect to the middle triangular wall surface portion 222 and the center lower wall surface portion 212. Since a plurality of triangular wall surfaces are coupled thereby, the strength of wall surfaces can be further improved.

(4) The side wall surface portions 230, 230 were formed into a triangular shape. The strength of the wall portion 20 can be further improved thereby.

(5) Every surface constituting the upper skirt surface portions 102, the lower skirt surface portions 103, and the pair of wall portions 20, 20 was sloped facing upward. Since every surface constituting the upper skirt surface portion 102, the lower skirt surface portion 103, and the pair of wall portions 20, 20 thereby receives a downward component force with respect to the wind, resistive force against wind can be improved.

Second Embodiment

The second embodiment of the environment controlled greenhouse according to the present invention is now explained with reference to FIGS. 5 to 8. In the explanation for the second embodiment and the embodiments thereafter, the same symbol is assigned for the same constituent element, while the explanation thereof is omitted or simplified.

The environment controlled greenhouse 1 according to the second embodiment is different from the first embodiment with respect to the shapes of the top surface portion 101 and the center upper wall surface portion 211 as shown in FIGS. 5 to 8.

The top surface portion 101 of the second embodiment comprises a pair of top board portions 111, 111.

Each of the pair of top board portions 111, 111 is formed into a rectangular shape. Each of the pair of top board portions 111, 111 is also disposed adjacent to each other in the transverse direction. More specifically, the pair of top board portions 111, 111 are disposed adjacent to each other after aligning the positions of the edges (sides) in the longitudinal direction. The pair of top board portions 111, 111 thereby forms a ridge portion 112 at the adjacent position. In this embodiment, the pair of top board portions 111, 111 forms the ridge portion 112 at the position of the center line A-A.

The center upper wall surface portion 211 in the second embodiment comprises a pair of top surface side wall surface portions 213, 213 and a center triangular wall surface portion 214.

Each of the pair of top surface side wall surface portions 213, 213 is formed into a trapezoidal shape and disposed adjacent to each other in the transverse direction to be disposed in a ridge forming manner. In this embodiment, each of the pair of top surface side wall surface portions 213, 213 is disposed in a ridge forming manner along the center line A-A. Each of the pair of top surface side wall surface portions 213, 213 is also formed so that the side along the center line A-A among the sides in the transverse direction is shorter, and the side adjacent to the upper triangular wall surface portion 221 is formed longer. For each of the pair of top surface side wall surface portions 213, 213, the side adjacent the upper triangular wall surface portion 221 is formed to have the same length as the length of a side of the upper triangular wall surface portion 221.

The center triangular wall surface portion 214 is connectedly installed to the pair of top surface side wall surface portions 213, 213 and is in continuous contact with the central lower wall surface portion 212. Each of the two sides of the center triangular wall surface portion 214 is formed to have the same length as the side of the edge in the longitudinal direction of the pair of top surface side wall surface portions 213, 213. Further, the remaining side of the center triangular wall surface portion 214 is formed to have the same length as the length in the transverse direction of the top surface portion 101. In other words, the remaining side of the center triangular wall surface portion 214 is formed to have the same length as the side of the edge in the longitudinal direction of the central lower wall surface portion 212.

The above environment controlled greenhouse 1 of the second embodiment attains the following effect.

(6) The top surface portion 101 was constructed with the pair of rectangular top board portions 111, 111, which are disposed adjacent to each other in the transverse direction and form a ridge portion 112 at adjacent positions. Since the top surface portion 101 can be sloped thereby with respect to the installation surface L, accumulation of snow, rain, or the like on the top surface portion 101 can be prevented.

(7) The center upper wall surface portion 211 was constructed with: the pair of top surface side wall surface portions 213, 213, which are disposed adjacent to each other in the transverse direction and disposed in a ridge forming manner; and the triangular center triangular wall surface portion 214 in continuous contact with the pair of top surface side wall surface portions 213, 213 and in continuous contact with the center lower wall surface portion 212. The strength of the center upper wall surface portion 211 can be improved thereby even if the ridge portion 112 is formed on the top surface portion 101.

While a preferred embodiment of the environment controlled greenhouse of the invention has been explained above, the present invention is not limited to the embodiments discussed above and can be modified appropriately.

For example, an entrance (not shown) may be provided to the environment controlled greenhouse 1. The entrance (not shown) may be provided on one of the pair of wall portions 20, 20.

The above embodiments have explained an embodiment where the top surface portion 101 is disposed approximately parallel to the installation surface L (horizontal surface). Meanwhile, the top surface portion 101 may be disposed in a sloped manner with respect to the installation surface L. Rain fall on the top surface portion 101 thereby falls to the side along the slope, so that leakage of rain or the like can be prevented.

In the above embodiment, solar cells (not shown) may also be disposed instead of resin sheets. Since every surface constituting the upper skirt surface portion 102, the lower skirt surface portion 103, and the pair of wall portions 20, 20 is sloped facing upward, the light collection efficiency of the solar cells (not shown) can be improved.

In the above embodiments, each of the top surface portion 101, upper skirt surface portion 102, lower skirt surface portion 103, center wall surface portion 210, middle wall surface portion 220, and side wall surface portion 230 has been explained as a single constituent member, but the embodiments thereof are not limited thereto. Specifically, each of the above constituents may be integrally formed with a sheet-like member or the like. The top surface portion 111, the top surface side wall surface portion 213, and the center triangular wall surface portion 214 may also be integrally formed in a similar manner with a sheet-like member or the like.

In the above embodiments, a vinyl greenhouse has been explained as an example of the environment controlled greenhouse 1, but the environment controlled greenhouse 1 is not limited thereto. For example, plant cultivating greenhouses and refrigerated storage sheds are other conceivable examples of environment controlled greenhouses.

REFERENCE SIGNS LIST

1 Environment controlled greenhouse
10 Main body portion
20 Wall portion
101 Top surface portion
102 Upper skirt surface portion
103 Lower skirt surface portion
111 Top board portion
112 Ridge portion
210 Center wall surface portion
211 Center upper wall surface portion
212 Center lower wall surface portion
213 Top surface side wall surface portion
214 Central triangular wall surface portion
220 Middle wall surface portion
221 Upper triangular wall surface portion
222 Middle triangular wall surface portion
223 Lower triangular wall surface portion
230 Side wall surface portion
L Installation surface

The invention claimed is:

1. An environment controlled greenhouse comprising: a main body portion formed into an arched shape with a plurality of flat surfaces; and a pair of wall portions, wherein the pair of wall portions are installed on respective ends in a longitudinal direction of the main body portion and are comprised of a plurality of flat surfaces that are sloped with respect to an installation surface,
wherein the main body portion comprises:
    a top surface portion formed into a shape and disposed at a topmost portion of the environment controlled greenhouse;
    a pair of upper skirt surface portions connectedly installed to respective edges in a transverse direction of the top surface portion; and
    a pair of lower skirt surface portions connectedly installed to an edge in an installation direction of the respective upper skirt surface portions and disposed in a sloped manner with respect to the installation surface,
wherein each of the wall portions comprises:
    a center wall surface portion connectedly installed to an edge in the longitudinal direction of the top surface portion;
    a pair of middle wall surface portions connectedly installed to respective edges in the transverse direction of the center wall surface portion and to an edge in the longitudinal direction of the upper skirt surface portion; and
    a pair of side wall surface portions connectedly installed to an edge in the transverse direction of the respective middle wall surface portions and to an edge in the longitudinal direction of the respective lower skirt surface portions.

2. The environment controlled greenhouse of claim 1, wherein the center wall surface portion comprises:
    a center upper wall surface portion connectedly installed to an edge in the longitudinal direction of the top surface portion; and
    a center lower wall surface portion connectedly installed to an edge in an installation direction of the center upper wall surface portion and disposed at an angle with respect to the center upper wall surface portion.

3. The environment controlled greenhouse of claim 2, wherein the top surface portion comprises a pair of top board portions, wherein the pair of top board portions are disposed adjacent to each other in the transverse direction and form a ridge portion at adjacent positions.

4. The environment controlled greenhouse of claim 3, wherein the center upper wall surface portion comprises:
    a pair of top surface side wall surface portions, wherein the pair of top surface side wall surface portions are disposed adjacent to each other in the transverse direction and disposed in a ridge forming manner; and
    a triangular center triangular wall surface portion in continuous contact with the pair of top surface side wall surface portions and in continuous contact with the center lower wall surface portion.

5. The environment controlled greenhouse according to claim 2, wherein each of the middle wall surface portions comprises:
    a triangular upper triangular wall surface portion connectedly installed to the edge in the longitudinal direction of the upper skirt surface portion and to an edge in the transverse direction of the center upper wall surface portion;
    a triangular middle triangular wall surface portion connectedly installed to a remaining edge of the upper triangular wall surface portion and disposed at an angle with respect to the upper triangular wall surface portion; and
    a triangular lower triangular wall surface portion connectedly installed to an edge of the middle triangular wall surface portion, connectedly installed to an edge in the transverse direction of the center lower wall surface portion, and disposed at an angle with respect to the middle triangular wall surface portion and the center lower wall surface portion.

6. The environment controlled greenhouse according to claim 1, wherein the side wall surface portions are formed into a triangular shape.

7. The environment controlled greenhouse according to claim 1, wherein every surface constituting the upper skirt surface portions, the lower skirt surface portions, and the pair of wall portions is sloped facing upward.

* * * * *